United States Patent [19]

Schirmer et al.

[11] Patent Number: 6,060,548
[45] Date of Patent: May 9, 2000

[54] SOCKET BASE FILLER FOR ELECTRIC LAMPS

[75] Inventors: Rainer Schirmer, Tuerkheim; Johann Schoenwetter, Langerringen; Armin Wilhelm, Oberneufnach, all of Germany

[73] Assignee: Patent-Treuhand-Gesellschaft fuer elektrische Gluehlampen mbH, Munich, Germany

[21] Appl. No.: 09/194,076

[22] PCT Filed: Mar. 26, 1998

[86] PCT No.: PCT/DE98/00900

§ 371 Date: Nov. 20, 1998

§ 102(e) Date: Nov. 20, 1998

[87] PCT Pub. No.: WO98/43267

PCT Pub. Date: Oct. 1, 1998

[30] Foreign Application Priority Data

Mar. 26, 1997 [DE] Germany ............... 197 12 740

[51] Int. Cl.⁷ ............... C08K 3/20; C08L 83/00; C08L 61/04; C08L 1/00
[52] U.S. Cl. ............... 524/425; 524/27; 524/35; 524/492; 524/493; 524/588
[58] Field of Search ............... 524/425, 492, 524/493, 588

[56] References Cited

U.S. PATENT DOCUMENTS

| | | | |
|---|---|---|---|
| 4,132,701 | 1/1979 | Tapis | 260/42 |
| 4,145,332 | 3/1979 | Coxon | 260/42.52 |
| 4,225,496 | 9/1980 | Columbus et al. | 260/29.6 |
| 5,231,123 | 7/1993 | Goel et al. | 524/77 |

FOREIGN PATENT DOCUMENTS

| | | |
|---|---|---|
| 0261722 | 3/1988 | European Pat. Off. . |
| 1029097 | 4/1958 | Germany . |
| 4420574 | 12/1995 | Germany . |
| 19626378 | 1/1998 | Germany . |
| 61108 | 12/1947 | Netherlands . |
| 349244 | 4/1931 | United Kingdom . |
| 690698 | 4/1953 | United Kingdom . |
| 2026003 | 1/1980 | United Kingdom . |

OTHER PUBLICATIONS

Patent Abstracts of Japan, vol. 008, No. 256 (E–280), Nov. 22, 1984 & JP 59 128752 A (Karupu Kogyo KK), Jul. 24, 1984, siehe Zusammenfassung.

Patent Abstracts of Japan, vol. 014, No. 557 (E–1011), Dec. 11, 1990, & JP 02 239540 A (Toshiba Lighting & Technol Corp) Sep. 21, 1990, siehe Zusammenfassung.

Grant & Hackh's "Chemical Dictionary" 5th Edition, p. 354, 1987.

*Primary Examiner*—Tae Yoon
*Assistant Examiner*—Katarzyna Wyrozebski
*Attorney, Agent, or Firm*—Carlo S. Bessone

[57] ABSTRACT

A capping cement for electric lamps which has a minimal resin content. The capping cement includes both natural and synthetic resins, the content of the synthetic resins amounting to not more than 11 percent by weight and that of the natural resins not more than 5 percent by weight. Calcites are used exclusively as fillers. The weight proportion of natural resin to synthetic resin is advantageously between 0.1 and 0.5.

11 Claims, No Drawings

SOCKET BASE FILLER FOR ELECTRIC LAMPS

The invention relates to a capping cement for electric lamps.

I. PRIOR ART

A capping cement of this kind is disclosed, for example, in European Patent EP 0 261 722. The capping cement described in that document consists of a mixture of natural resins and synthetic resins, fillers and solvents and further additives. Natural resins used are shellac and rosin. Synthetic resins mentioned are silicone resin and phenolformaldehyde resin. The filler component consists of calcium carbonate, and the solvent is ethanol. In addition, this cement includes hexamethylenetetramine as an additive.

II. SUMMARY OF THE INVENTION

The object of the invention is to provide a capping cement for electric lamps which has a minimal resin content, is inexpensive, and provides the lamp cap with satisfactory resistance to removal by twisting.

This object is achieved in accordance with the invention claimed herein. The low resin content is made possible essentially as a result of the exclusive use of calcite in crystalline form, which has a comparatively low absorbency, as the filler. The use of calcite having a particle size of between 0.1 μm and 700 μm has proven particularly advantageous, the average particle size of the calcite advantageously being about 200 μm and the calcite advantageously possessing an average density of 2.7 g/cm$^3$. The resin content of the capping cement of the invention is not more than 16 percent by weight. In the preferred embodiments, indeed, it is below 13 percent by weight. The satisfactory resistance of the capping cement, especially a satisfactory resistance to removal by twisting in the case of lamps equipped with screw and bayonet caps, is made possible by using a mixture of natural resins and synthetic resins, the natural resin component amounting to not more than 5 percent by weight and the synthetic resin component not more than 11 percent by weight of the capping cement. A ratio of the natural resin weight proportions to the synthetic resin weight proportions of between 0.1 and 0.5, and with particular advantage between 0.12 and 0.4, has proven advantageous in this context. By virtue of the low resin content and the combination of natural resins, such as shellac and rosin, with synthetic resins, such as phenolic resin and silicone resin, the capping cement of the invention is also inexpensive. Advantageously, the synthetic resin component of the capping cement of the invention contains only phenolic resins and silicone resins. In comparison with the prior art, the capping cement of the invention consists of only a few components.

The invention is illustrated below with reference to three preferred embodiments.

III. DESCRIPTION OF THE PREFERRED EMBODIMENTS

In accordance with the particularly preferred first embodiment, the synthetic resin component of the capping cement of the invention consists of 8.1 percent by weight of phenolic resin of type K 0791 from Bakelite and 0.7 percent by weight of silicone resin of type 6-2230 from Dow Corning. The natural resin component of this capping cement consists of 2.5 percent by weight of rosin and 0.8 percent by weight of shellac. The filler component is formed by 74.8 percent by weight of calcite of type JP/LM from Merkle GmbH and 8.0 percent by weight of calcite of type Nofacal Z from Bayerische Farben- und Mineralwerke. The particle size of the crystalline calcite lies between 0.1 μm and 700 μm. The average particle size, by which is meant what is known as the D50 value, of the calcite is approximately 200 μm. The average density of the calcite is 2.7 g/cm$^3$. The solvents used are 1.1 percent by weight of isobutanol and 3.7 percent by weight of ethanol. In addition, the capping cement of the first embodiment of the invention also includes 0.3 percent by weight of a 1.8 percent strength solution of fuchsine red as dye. In this case, the synthetic resin content amounts in total to 8.8 percent by weight and the natural resin content in total to 3.3 percent by weight, resulting in an overall resin content of 12.1 percent by weight. Accordingly, the weight proportion of natural resin to synthetic resin is 0.375.

In the second embodiment of the invention, the synthetic resin component of the capping cement consists of 8.5 percent by weight of phenolic resin of type K 0791 from Bakelite and 0.65 percent by weight of silicone resin of type 6-2230 from Dow Corning. The natural resin component of this capping cement consists of 2.69 percent by weight of rosin and 0.81 percent by weight of shellac. The filler component is formed by 78.7 percent by weight of calcite of type JP/LM from Merkle GmbH and 8.6 percent by weight of calcite of type Nofacal Z from Bayerische Farben- und Mineralwerke. The particle size of the crystalline calcite lies between 0.1 μm and 700 μm. The average particle size of the calcite is approximately 200 μm. The average density of the calcite is 2.7 g/cm$^3$. The solvent used is 5.4 percent by weight of ethanol. In this case, therefore, the synthetic resin content amounts in total to 9.15 percent by weight and the natural resin content in total to 3.5 percent by weight, giving an overall resin content of 12.65 percent by weight. Accordingly, the weight proportion of natural resin to synthetic resin is 0.383.

In the third embodiment of the invention, the synthetic resin component of the capping cement consists of 9.90 percent by weight of phenolic resin of type K 0791 from Bakelite and 0.62 percent by weight of silicone resin of type 6-2230 from Dow Corning. The natural resin component of this capping cement consists of 0.97 percent by weight of rosin and 0.39 percent by weight of shellac. The filler component is formed by a total of 83.37 percent by weight of calcite. The particle size of the crystalline calcite lies between 0.1 μm and 700 μm. The average particle size, by which is meant the D50 value of the particle size of the calcite is approximately 200 μm. The average density of the calcite is 2.7 g/cm$^3$. The solvents used are 1.01 percent by weight of isobutanol and 3.74 percent by weight of ethanol. In this case, therefore, the synthetic resin content amounts in total to 10.52 percent by weight and the natural resin content in total to 1.36 percent by weight, giving an overall resin content of 11.88 percent by weight. Accordingly, the weight proportion of natural resin to synthetic resin is 0.129.

When used in lamps with E27 screw caps and bayonet caps, all of the cement compositions ensure a cap twist removal resistance of more than 10 Nm. In addition, the capping cement paste of the invention has a storage life of at least 8 weeks following production.

The invention is not restricted to the exemplary embodiments described in detail above. For example, calcites from other suppliers, with the same quality features, can also be used as fillers. The capping cement compositions described above can also be prepared as powders, without solvent. In that case, the solvents are not added until the point when the cement paste is prepared by stirring directly prior to the capping of the lamps.

What is claimed is:

1. A capping cement for electric lamps, having a synthetic resin content comprising phenolic resins and/or silicone resins, a natural resin content, a filler content, and a solvent, wherein the synthetic resin content of the capping cement amounts to not more than 11 percent by weight, the natural resin content of the capping cement amounts to not more than 5 percent by weight, and the filler content consists exclusively of calcite in crystalline form.

2. The capping cement as claimed in claim 1, wherein the synthetic resin content consists exclusively of silicone resins and/or phenolic resins.

3. The capping cement as claimed in claim 1, wherein the weight proportion of natural resin content to synthetic resin content lies between 0.1 and 0.5.

4. The capping cement as claimed in claim 3, wherein the weight proportion of natural resin content to synthetic resin content lies between 0.12 and 0.4.

5. The capping cement as claimed in claim 1, wherein the particle size of the filler content is from 0.1 $\mu$m to 700 $\mu$m.

6. The capping cement as claimed in claim 1, wherein the average particle size of the filler content is 200 $\mu$m.

7. The capping cement as claimed in claim 1, wherein the average density of the filler content is 2.7 g/cm$^3$.

8. The capping cement as claimed in claim 1, wherein the solvent content consists of ethanol and/or isobutanol.

9. The capping cement as claimed in claim 1, wherein the filler content of the capping cement amounts to more than 80 percent by weight.

10. The capping cement as claimed in claim 9, wherein the synthetic resin and the natural resin together are no more than 13 percent by weight of the capping cement.

11. In an electric lamp capping cement that includes a synthetic resin, a natural resin, a filler, and a solvent, the improvement wherein:

the synthetic resin is from 8 to 11 percent by weight of the capping cement;

the natural resin is from 1 to 5 percent by weight of the capping cement;

the synthetic resin and the natural resin together are no more than 13 percent by weight of the capping cement and a weight proportion of the natural resin to the synthetic resin is between 0.12 and 0.4; and the filler is more than 80 percent by weight of the capping cement.

* * * * *